(12) United States Patent
Riccio et al.

(10) Patent No.: US 11,890,925 B2
(45) Date of Patent: Feb. 6, 2024

(54) DEVICE FOR REGULATING A COOLING AIR FLOW IN A VEHICLE

(71) Applicant: AUTOMOBILI LAMBORGHINI S.P.A., Sant'Agata Bolognese (IT)

(72) Inventors: Aniello Riccio, Vitulazio (IT); Ugo Riccio, Modena (IT); Andrea Sellitto, Aversa (IT); Antonio Torluccio, Imola (IT)

(73) Assignee: AUTOMOBILI LAMBORGHINI S.P.A., Sant'Agata Bolognese (IT)

( * ) Notice: Subject to any disclaimer, the term of this patent is extended or adjusted under 35 U.S.C. 154(b) by 189 days.

(21) Appl. No.: 17/441,052

(22) PCT Filed: Mar. 11, 2020

(86) PCT No.: PCT/IB2020/052103
§ 371 (c)(1),
(2) Date: Sep. 20, 2021

(87) PCT Pub. No.: WO2020/194099
PCT Pub. Date: Oct. 1, 2020

(65) Prior Publication Data
US 2022/0161651 A1    May 26, 2022

(30) Foreign Application Priority Data
Mar. 22, 2019   (IT) .................. 102019000004187

(51) Int. Cl.
*B60K 11/00*       (2006.01)
*B60K 11/08*       (2006.01)
(52) U.S. Cl.
CPC .................. *B60K 11/085* (2013.01)

(58) Field of Classification Search
CPC .......................... B60K 11/085; B60K 11/08
(Continued)

(56) References Cited

U.S. PATENT DOCUMENTS 8,973,607 B2 *   3/2015   Schwarz ............. B60K 11/085
                                              454/319
9,365,106 B2 *   6/2016   Brückner ............ B60K 11/085
(Continued)

FOREIGN PATENT DOCUMENTS

DE       10137175 A1    2/2003
DE    102014016353 A1    6/2015
(Continued)

OTHER PUBLICATIONS

International Search Report and Written Opinion dated Jun. 22, 2020 from counterpart International Patent Application No. PCT/IB2020/052103.

*Primary Examiner* — Hau V Phan
(74) *Attorney, Agent, or Firm* — SHUTTLEWORTH & INGERSOLL, PLC; Timothy J. Klima

(57) ABSTRACT

A device for controlling a hot air flow, for example in an engine compartment of a motor car, includes at least one wing connectable to an air inflow opening of an engine compartment of a motor car and movable between a position for closing and a position for opening the air inflow opening. A drive module is configured to apply a predetermined thrust force and a transmission apparatus is capable of transmitting the thrust force from the drive module to the wing to move the wing from the closed position to the open position and vice versa. The drive module includes at least one actuator made of a shape-memory alloy such that the thrust force is applied when the actuator reaches a predetermined temperature.

18 Claims, 2 Drawing Sheets

(58) Field of Classification Search
USPC .......................................................... 180/68.1
See application file for complete search history.

(56) References Cited

U.S. PATENT DOCUMENTS

| | | | |
|---|---|---|---|
| 9,694,669 B2* | 7/2017 | Ruppert | B60R 19/52 |
| 9,840,144 B2* | 12/2017 | Aizawa | B60K 11/08 |
| 10,421,352 B2* | 9/2019 | Urbach | B60K 11/085 |
| 2008/0178526 A1 | 7/2008 | Browne et al. | |
| 2010/0330894 A1 | 12/2010 | Alexander et al. | |
| 2012/0132474 A1* | 5/2012 | Charnesky | B60K 11/085 |
| | | | 49/77.1 |
| 2013/0333501 A1* | 12/2013 | Knauer | B60K 11/085 |
| | | | 74/102 |
| 2015/0050875 A1* | 2/2015 | Knauer | B60K 11/085 |
| | | | 454/152 |
| 2015/0217633 A1* | 8/2015 | Huijzers | B60K 11/085 |
| | | | 454/145 |
| 2019/0039452 A1* | 2/2019 | Herlem | B60K 11/085 |

FOREIGN PATENT DOCUMENTS

| | | |
|---|---|---|
| DE | 102015006275 A1 | 12/2015 |
| WO | 2018109338 A1 | 6/2018 |

* cited by examiner

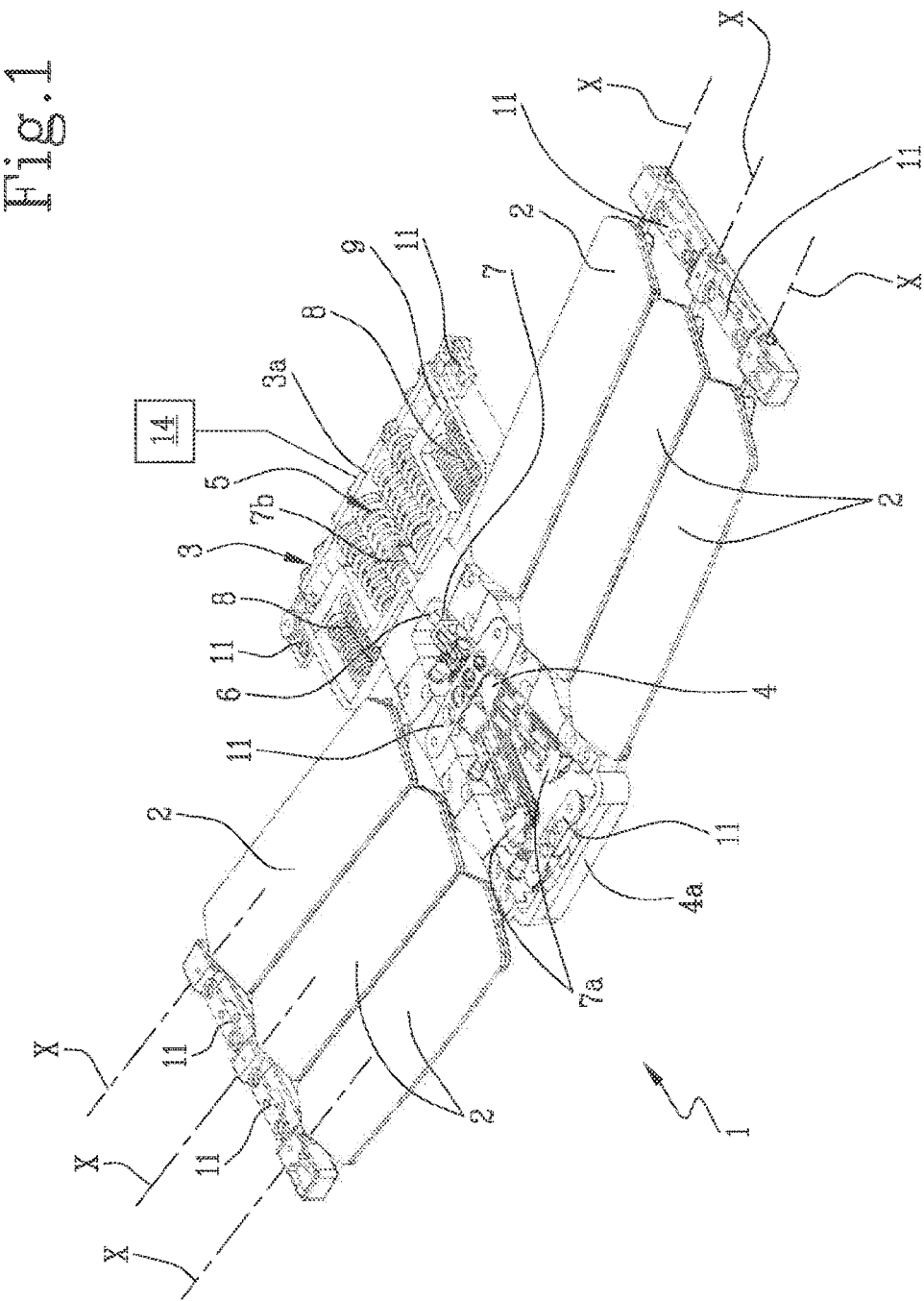

DEVICE FOR REGULATING A COOLING AIR FLOW IN A VEHICLE

This application is the National Phase of International Application PCT/I62020/052103 filed Mar. 11, 2020 which designated the U.S.

This application claims priority to Italian Patent Application No. 102019000004187 filed Mar. 22, 2019, which application is incorporated by reference herein.

TECHNICAL FIELD

This invention addresses the automotive sector, in particular, a device for regulating and/or controlling a hot air flow generated by a component of a vehicle, specifically, a motor car during its operation.

BACKGROUND ART

Generally speaking, a vehicle comprises different components which, during their operation, generate heat inside the compartment or housing in which each is located.

The typical example is the engine, which generates heat in the engine compartment; another example is the brakes, which generate heat that may be confined to a duct where the brakes are housed.

During normal operation, a motor car engine generates a considerable amount of heat which, if not correctly dissipated, may lead to serious damage to the engine itself and to other vehicle parts and components adjacent to the engine, especially those located in the engine compartment.

At the same time, the engine has to work at an optimum temperature of its own and the temperature in the compartment that houses the engine also has to remain at an optimum level.

For this purposes, devices have been developed which allow varying the inflow and outflow of air into and out of the engine compartment, so as to facilitate heat exchange with the outside atmosphere, thereby preventing unwanted overheating or excessive cooling.

Devices are known which comprise flaps or wings that move in such a way as to cover and uncover through slots or openings that allow air to flow from the inside of the engine compartment or generic space to the outside atmosphere, thus promoting the extraction of heat from the engine compartment.

Generally speaking, the through slots are, for example, provided on the bodywork of the motor car in proximity to the engine compartment and the wings are applied thereon.

Prior art devices, however, are relatively inefficient in that they necessitate implementing complex and cumbersome activating mechanisms, principally electrohydraulic or electromechanical, to control the movement of the wings correctly and according to the need to cool the engine compartment or other space involved.

DISCLOSURE OF THE INVENTION

In this context, the technical purpose which forms the basis of this disclosure is to propose a device for regulating the cooling air flow in a vehicle to overcome at least some of the above mentioned disadvantages of the prior art.

More specifically, the aim of this disclosure is to provide a device for regulating and controlling the cooling air flow in a compartment of a vehicle, in particular a motor car, and which is structurally simple, light in weight and manageable, while at the same time maintaining a high level of efficiency and reliability.

The technical purpose indicated and the aims specified are substantially achieved by a device for regulating an air flow in a compartment of a motor car—for example the engine compartment—comprising the technical features described in one or more of the appended claims.

This disclosure describes a preferred embodiment of a device for controlling a cooling flow in an engine compartment of a motor car and which comprises: at least one wing connectable to an air inflow opening of an engine compartment of a motor car and movable between a position for closing and a position for opening the air inflow opening; a drive module configured to apply a predetermined thrust force; and a transmission apparatus capable of transmitting the thrust force from the drive module to the wing to move the wing from the closed position to the open position.

The drive module comprises at least one actuator made of a shape-memory alloy such that the thrust force is applied when the actuator reaches a predetermined temperature.

BRIEF DESCRIPTION OF THE DRAWINGS

Further features and advantages of the invention are more apparent in the non-limiting description which follows of a preferred embodiment of a device for cooling an engine compartment of a vehicle, as illustrated in the accompanying drawings, in which:

FIG. 1 is a view, partly in blocks, of the device according to this disclosure, for regulating the air flow in a compartment of a motor car;

DETAILED DESCRIPTION OF PREFERRED EMBODIMENTS OF THE INVENTION

Figure 2A:
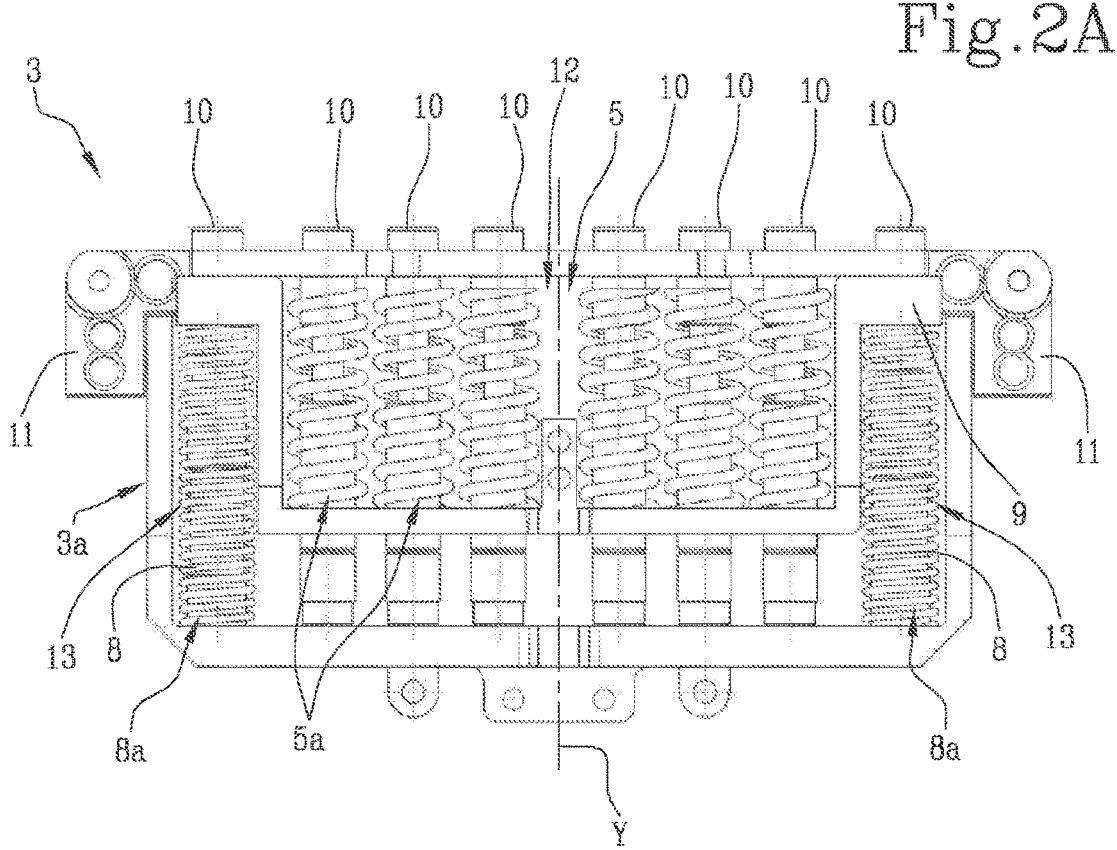
FIGS. 2A and 2B show two distinct operating conditions of a component of the device according to this disclosure.

The numeral 1 in the accompanying drawings denotes in its entirety a device for regulating a cooling air flow in a vehicle, preferably a motor car, hereinafter referred to simply as "device 1".

Generally speaking, the compartment is a delimited space which houses a car component that generates heat during its operation.

The compartment is, for example, the engine compartment and the component is the engine. In another example, the compartment is a brake cooling duct and the component is defined by the car brakes which are at least partly housed in or which face the duct.

Hereinafter, the engine compartment is expressly referred to as the preferred example of applying this solution but without thereby losing generality.

The device 1 comprises at least one wing 2, a drive module 3 and a transmission apparatus 4.

The wing 2 is connectable to an air flow opening of a compartment of a motor car, not illustrated, for example an engine compartment, and is movable between an opening closed and an opening open position.

In other words, the wing 2 adapts to the shape and size of a respective flow opening made, for example, on the bodywork of the motor car, preferably at its engine compartment.

In alternative solutions, the flow opening may be the inlet or the outlet of a duct connecting the engine compartment to an outside atmosphere or to another compartment of a car component that generates heat during its operation.

The wing 2 is movable between a closed position in which it is positioned in such a way as to close the flow opening and an open position in which the wing is positioned in such a way as to leave the opening at least partly open.

The air flow opening is configured to put the interior of the engine compartment into fluid communication with an outside atmosphere so as to allow air to flow between the two in order to promote heat exchange which can rapidly and efficiently reduce the temperature inside the engine compartment.

Preferably, the wing 2 is moved by rotation about a respective axis of rotation X, preferably fixed.

Preferably, when it is positioned to close the inflow opening, the wing 2 is configured to be positioned flush with an outer profile of the engine compartment, that is to say, facing the outside atmosphere, so that the wing 2 does not negatively affect the aerodynamic profile of the motor car.

The passage of the wing 2 from the inflow opening closed position to the inflow opening open position is obtained by a drive module 3 which is configured to apply a predetermined thrust force that is transmitted to the wing 2 by the transmission apparatus 4.

More specifically, the drive module 3 comprises at least one actuator 5 made of a shape-memory alloy configured to apply the thrust force when the actuator reaches a predetermined temperature.

Shape memory materials are metal alloys capable of "remembering" a certain structural shape, to which they return when a change of state occurs as a result of reaching a predetermined temperature, which depends on the composition of the alloy.

In other words, these materials are able, simply by being heated, to return to their original shape even after deformations which have substantially changed their shape.

More specifically, the actuator 5 is made, for example, using a shape memory alloy comprising nickel and titanium.

This alloy is configured, for example, to show a change of state at a temperature between 25° C. and 75° C.

Depending on the application, the shape memory alloy is configured to show a change of state at a temperature between 25° C. and 75° C., with an interval tolerance of 15°.

Thus, the actuator 5 has an original shape which it returns to every time it is exposed to a temperature that is high enough to produce a change of state.

The actuator 5 is disposed in such a way that the change of shape due to the change of state generates the thrust force which, through the transmission apparatus 4, causes the wing 2 to switch from the air flow opening closed position to a position where the air flow opening is open.

Structurally, the drive module 3 comprises a first frame 3a configured to house the at least one actuator 5.

The device 1 comprises a second frame 4a, which houses the transmission apparatus 4 and on which the at least one wing 2 is mounted.

The first frame 3a and the second frame 4a are in communication with each other through a slideway 6 in which a pusher 7 of the transmission apparatus 4 is inserted.

In other words, the device has a pair of frames 3a, 4a in which the drive module 3 and the transmission apparatus 4 are disposed, respectively; the frames are in communication with each so that the pusher 7 can couple the transmission apparatus 4 to the actuator 5 of the drive module 3.

The first frame 3a and the second frame 4a are combined in the device 1 but are structurally distinct so that they can be separated—for example to facilitate maintenance or repairs on the drive module 3 and/or on the transmission apparatus 4 or even on the wings 2.

More specifically, in the example illustrated, the pusher 7 has a first end 7a provided with a rack profile and the wing 2 comprises a gear configured to mesh with the first end 7a in such a way that the movement of the pusher 7 brings the wing 2 from the closed position to the open position by rotation about the respective axis of rotation X.

Generally speaking, the pusher 7 and the wing 2 mesh with each other in such a way that the movement of the pusher 7 brings the wing 2 from the closed position to the open position.

To allow the wing 2 to return to the air inlet closed position when the temperature of the engine compartment has dropped to a sufficiently low level, the drive module comprises at least one opposing actuator 8 configured to apply an opposing force to oppose the thrust force; that is to say, the opposing force has the same orientation as, but opposite direction to, the thrust force; the opposing actuator 8 preferably comprises at least one opposing spring.

The opposing actuator 8 and the shape memory actuator 5 are housed in the first frame 3a and preferably connected thereto.

The actuator 5 and the opposing actuator 8 operate on opposite sides of a common slide 9, which is preferably cup-shaped and which is also housed in the first frame 3a.

In the first frame 3a, the drive module 3 comprises one or more guide pins 10 for guiding the slide 9.

The slide 9 is preferably guided in translation in parallel with the thrust force by one or more guide pins 10.

In practice, the actuator 5 and the opposing actuator 8 are both coupled to the slide 9, which is interposed between them in the first frame 3a in such a way that it can be moved translationally with to-and-fro, reciprocating motion along a sliding direction Y under the action of the thrust and opposing forces.

To transmit the movement from the drive module 3 to the wing 2, the pusher 7 has a second portion 7b, directed towards the drive module 3, and is coupled to the slide 9, preferably removably, in such a way that movement of the slide causes a corresponding translational movement of the pusher, preferably also along the sliding direction Y.

More specifically, the slide 9 is fitted in the first frame 3 in such a way as to divide it into a first compartment 12, housing the at least one actuator 5, and a second compartment 13, housing the at least one opposing actuator 8.

The first compartment 12 is preferably disposed centrally, with two second compartments 13 disposed on opposite sides of it.

The actuator 5 comprises at least one thrust spring 5a and/or the opposing actuator 8 comprises at least one opposing spring 8a, the springs 5a, 8a being preferably helical springs and, still more preferably, compression springs: that is to say, the springs are configured to be progressively compressed as a function of an increase of the load applied thereon.

More specifically, through the slide 9, the thrust force applied by the compression springs 5a has the effect of compressing the opposing springs 8a, and in the same way, through the slide 9, the opposing force applied by the opposing springs 8a has the effect of compressing the thrust springs 5a.

Advantageously, the cup-shaped structure of the slide 9 and the division of the first frame 3a into the first compartment 12 and second compartment 13 allows the thrust springs 5a and the opposing springs 8a to be positioned at least partly in parallel with each other so as to reduce the dimensions of the drive module 3, at least along the axis Y.

The frame 3a and the slide 9 allow positioning and using a plurality of springs 5a, 8a in parallel as a function of the force that the drive module 3 is required to apply.

Furthermore, separation of the first frame 3a from the second frame 4a makes it possible to replace the group of thrust springs 5a and opposing springs 8a without operating on the transmission apparatus 4 and/or on the pusher 7.

The thrust springs 5a are preferably all parallel and close to each other and thus less subject to temperature differences which might upset the balance of the thrust force applied on the slide 9.

The drive module 3 is particularly compact and lends itself to being heated by a suitably channelled air flow in the vehicle in which the device 1 can be installed.

Operatively, when the thrust force is greater than the opposing force, the slide 9 is subjected to a movement which entrains the pusher 7 along with it to cause the wings 2 to move from the closed position to the open position. Conversely, when the opposing force is greater than the thrust force, the slide 9 is subjected to a movement which entrains the pusher 7 along with it to cause the wings 2 to move from the open position to the closed position.

In the preferred embodiment illustrated, the axis of translation Y and the axis of rotation X are oblique relative to each other.

The balance between the thrust force and the opposing force is determined by the state, hence the temperature, of the shape memory alloy the actuator 5 is made of: if the temperature is lower than the predetermined temperature necessary to trigger the change of state, the actuator 5 applies a thrust force that is lower than the opposing force and, consequently, the wing 2 is held at the closed position.

A rise in the temperature, on the other hand, triggers the change of state so the actuator tends to return to its original shape, thereby increasing the thrust force until reaching the point where it compensates and then exceeds the opposing force, causing the wing 2, through the transmission apparatus 4, to move from the closed position to the open position. Once the wing 2 is at the open position, the hot air can flow out of the engine compartment: for example when the car is stationary.

Figure 2B:
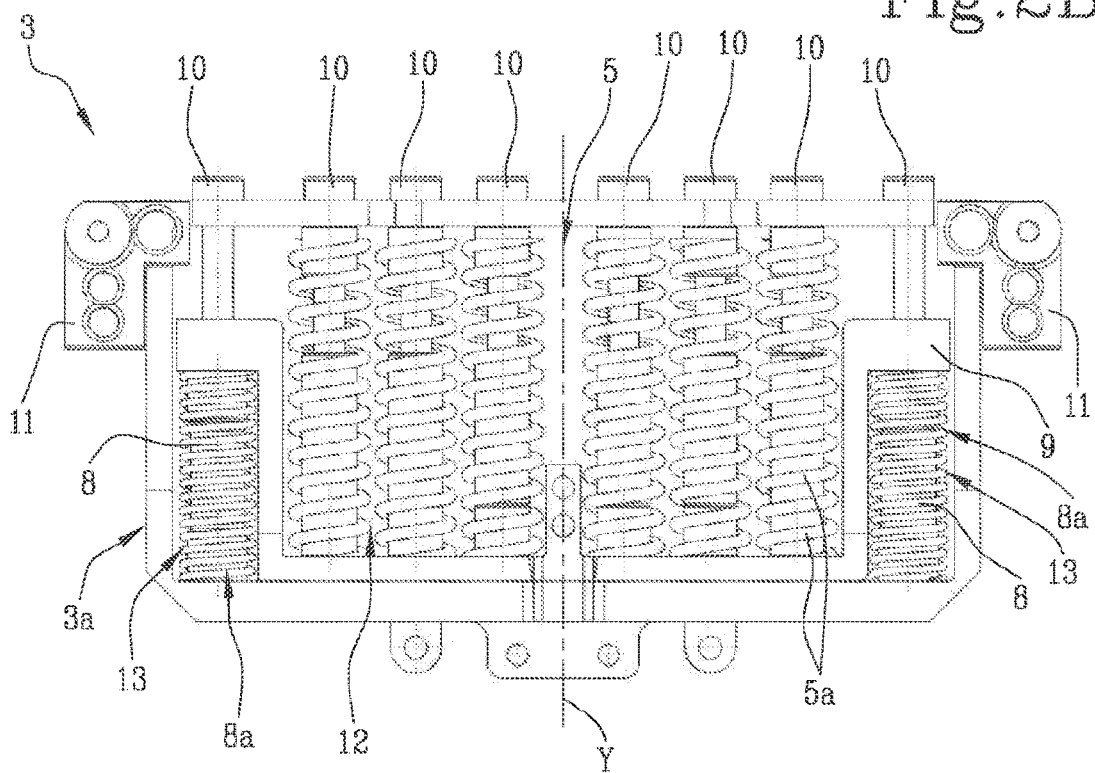

In the example illustrated, the actuator 5 comprises six thrust springs 5a whose original shape is elongated, as shown in FIG. 2B.

The thrust springs 5a return to their original, elongated shape when the temperature exceeds the predetermined temperature.

When the temperature of the actuator drops below the predetermined temperature, the opposing springs 8a—two in number, by way of example, in the embodiment illustrated—push the slide 9 and bring the thrust springs back to their short configuration, as shown in FIG. 2A.

The thrust springs 5a and/or the opposing springs 8a are disposed around respective guide pins 10 for guiding the slide 9 so it is correctly retained and operational in the first frame 3a.

In a possible embodiment, the shape memory actuator 5 and the opposing actuator 8 comprise respective pluralities of springs 5a, 8a disposed in parallel.

Advantageously, the device 1 according to this disclosure, comprises an air supply duct, schematically represented as a block 14, which is configured to feed the at least one actuator 5 with a hot air flow from the engine compartment and preferably from the engine. This ensures that the temperature of the actuator 5 is as close as possible to the actual temperature inside the engine compartment.

The device 1 preferably comprises a plurality of brackets 11 that allow it to be mounted securely to the vehicle.

Preferably, the brackets 11 are configured to allow the device 1 to be mounted to an inside surface of the housing compartment, for example in the engine compartment.

In the specific embodiment, the device comprises a plurality of wings 2, preferably equally subdivided and coupled on opposite sides of the transmission apparatus 4.

More specifically, the wings 2—six in number in the specific embodiment shown in FIG. 1—are coupled rotatably to the frame 4, that is to say, they are coupled in such a way that they can rotate about respective axes of rotation X to pass from the inlet opening open position to the inlet opening closed position and vice versa.

Preferably, the axes of rotation X of wings 2 located on the same side of the transmission apparatus 4 are parallel to each other.

As shown in FIGS. 2A-2B, the drive module 3 comprises an actuator 5 and an opposing actuator 8 which respectively comprise, for example, six thrust springs 5a and two opposing springs 8a coupled to the slide 9 in such a way as to allow it to move with reciprocating motion along the axis of translation Y.

In alternative embodiments not illustrated, the actuators 5 and 8 may have a different number of thrust springs 5a and/or opposing springs 8a based, for example, on the dynamics expected of the device 1 and of the dimensions thereof.

The pusher 7, inserted in the slideway 6 which puts the first frame 3a and the second frame 4a in communication with each other, is coupled at a first end 7a to the wings 2, for example by a rack gear with which the wings 2 are meshed.

The second end 7b of the pusher 7, on the other hand, is coupled to the slide 9 in such a way as to allow the thrust force and the opposing force to be transmitted from the drive module 3 to the wings 2.

In alternative embodiments not illustrated, the device 1 comprises a plurality of wings which are not driven all together but can be driven independently of each other or in groups.

In use, the thrust force and the opposing force act on the slide 9 and cause a translational movement thereof, which is converted into a rotational movement of the wings 2 to open or close the inlet opening.

More specifically, the opening movement is determined by a rise in temperature which produces a change of state in the shape memory alloy the thrust springs 5a of the actuator 5 are made of, so as compensate and then overcome the opposing force.

Conversely, the closing movement is determined by a drop in temperature to a level where it is no longer sufficient to sustain the change of state of the shape memory alloy, thus reducing the thrust force the actuator 5 is able to generate until it is overcome by the opposing force which deforms the thrust springs 5a, specifically by compression.

In other words, each time the temperature in the compartment or space in which the car component is installed, hence the temperature the actuator is exposed to, exceeds the temperature necessary to obtain a change of state of the shape memory alloy, the thrust force exceeds the opposing force, producing a movement of the slide 9 which, through the transmission apparatus 4, in turn moves the wings 2 from the closed position to the open position.

When the compartment has cooled down, the temperature again drops below the temperature that causes the change of state in the shape memory alloy and the opposing force is once again greater than the thrust force, making the slide 9 return so it moves the wings 2 back to the closed position.

Advantageously, this solution achieves the preset aims by overcoming the disadvantages of the prior art and providing the user with a device for regulating a cooling air flow in a compartment of a motor car, for example the engine compartment, and which does not require complex electromechanical or electrohydraulic actuating systems; the structure of the device is thus simplified and its weight and dimensions significantly reduced.

In effect, the device of this disclosure controls the movement of the wings 2 by means of a drive module 3 which is responsive to temperature, that is to say, which is activated and deactivated solely as a function of the temperature it is exposed to.

The invention claimed is:

1. A device for regulating or controlling an air flow in a vehicle compartment, comprising:
    at least one wing connectable to an air flow opening of the vehicle compartment and movable between a closed position for closing the air flow opening and an open position for opening the air flow opening;
    a drive module configured to apply a predetermined thrust force;
    a transmission apparatus adapted to transmit the thrust force from the drive module to the at least one wing to bring the at least one wing at least from the closed position to the open position;
    the drive module comprising at least: a first actuator made of a shape-memory alloy configured to apply the thrust force when the first actuator reaches a predetermined temperature, and at a second actuator configured to apply an opposing force to oppose the thrust force;
    a slide which is guided in translation in parallel with the thrust force and which is interposed between the first actuator and the second actuator such that the first actuator and the second actuator operate on opposite sides of the slide.

2. The device according to claim 1, wherein the drive module comprises a first frame configured to house at least one chosen from the first actuator, the second actuator and the slide, and wherein the device further comprises a second frame containing the transmission apparatus.

3. The device according to claim 2, wherein the slide is housed in the first frame to divide an interior of the first frame into a first compartment containing the first actuator and two second compartments, each containing one of the second actuator, the first compartment being disposed centrally in the first frame, with the two second compartments respectively disposed in the first frame on opposite sides of the first compartment.

4. The device according to claim 2, wherein the at least one wing is mounted on the second frame and wherein the first frame and the second frame are in communication with each other through a slideway in which a pusher of the transmission apparatus is inserted.

5. The machine according to claim 2, wherein the first frame and the second frame are separably joined to each other.

6. The device according to claim 1, wherein the first actuator comprises at least one thrust spring.

7. The device according to claim 6, wherein the at least one thrust spring is a compression spring.

8. The device according to claim 6, wherein the at least one thrust spring is a helical spring.

9. The device according to claim 1, wherein the first actuator comprises a plurality of thrust springs, disposed parallel to each other.

10. The device according to claim 1, wherein the second actuator comprises at least one opposing spring.

11. The device according to claim 1, and further comprising one or more guide pins guiding the slide in translation in parallel with the thrust force.

12. The device according to claim 11, wherein at least one chosen from at least one thrust spring and at least one opposing spring are disposed around respective ones of the one or more guide pins.

13. The device according to claim 11, wherein the slide is cup-shaped.

14. The device according to claim 1, wherein the at least one wing is rotatable about a respective axis of rotation, and wherein the transmission apparatus comprises a pusher including:
    a first portion including a first engagement device;
    a second portion, opposite to the first portion and facing towards the drive module;
    the at least one wing comprising a second engagement device configured to engage with the first engagement device such that a movement of the pusher brings the at least one wing from the closed position to the open position by rotation about the respective axis of rotation.

15. The device according to claim 14, wherein the second portion of the pusher is fixed or fixable to the slide.

16. The device according to claim 1, wherein the shape memory alloy comprises nickel and titanium, the shape memory alloy being configured to show a change of state at a temperature between 25° C. and 75° C.

17. The device according to claim 1, and further comprising an air supply duct configured to feed the first actuator with a hot air flow.

18. The device according to claim 1, wherein the vehicle compartment is an engine compartment of a motor car.

* * * * *